(12) United States Patent
Falcon

(10) Patent No.: US 6,285,374 B1
(45) Date of Patent: Sep. 4, 2001

(54) BLUNT INPUT DEVICE CURSOR

(75) Inventor: Stephen R. Falcon, Woodinville, WA (US)

(73) Assignee: Microsoft Corporation, Redmond, WA (US)

( * ) Notice: Subject to any disclaimer, the term of this patent is extended or adjusted under 35 U.S.C. 154(b) by 0 days.

(21) Appl. No.: 09/055,372

(22) Filed: Apr. 6, 1998

(51) Int. Cl.⁷ .............................. G06T 11/00; G09G 5/08
(52) U.S. Cl. ...................... 345/433; 345/145; 345/157
(58) Field of Search ................... 345/156, 339, 345/157, 145, 357, 337, 121, 178; 332/103

(56) References Cited

U.S. PATENT DOCUMENTS

| | | | | |
|---|---|---|---|---|
| 5,479,526 | * | 12/1995 | Benton et al. | 382/103 |
| 5,642,131 | * | 6/1997 | Pekelney et al. | 345/145 |
| 5,757,358 | | 5/1998 | Osga | 345/146 |
| 5,844,557 | * | 12/1998 | Shively | 345/339 |
| 5,917,486 | * | 6/1999 | Rylander | 345/339 |
| 5,986,639 | * | 11/1999 | Ozawa et al. | 345/146 |
| 5,990,862 | * | 11/1999 | Lewis | 345/145 |
| 6,014,127 | * | 1/2000 | Blomqvist | 345/145 |
| 6,034,689 | * | 3/2000 | White et al. | 345/357 |
| 6,049,325 | * | 4/2000 | Alexander | 345/157 |
| 6,057,827 | * | 5/2000 | Matthews | 345/145 |
| 6,075,537 | * | 6/2000 | Adapathya et al. | 345/357 |
| 6,078,935 | * | 6/2000 | Nielsen | 345/337 |

* cited by examiner

*Primary Examiner*—Matthew Luu
*Assistant Examiner*—Chante'Harrison
(74) *Attorney, Agent, or Firm*—Joesph R. Kelly; Westman, Champlin & Kelly, P.A.

(57) ABSTRACT

A system controls acquisition of visual targets with a cursor in a visual display displaced on a screen. A coordinate system is provided which is associated with the screen. A pointer is also provided which is associated with the cursor and which comprises a plurality of points in the coordinate system which define a cursor hot spot. The pointer is moved within the coordinate system based on position information from a user input device. A target region is provided in the coordinate system. The target region corresponds to a visual target and is acquired when at least one of the points in the cursor hot spot coincides with the target region.

29 Claims, 11 Drawing Sheets

BLUNT INPUT DEVICE CURSOR

BACKGROUND OF THE INVENTION

The present invention relates to a system for interacting with the visual display in a computer system. More particularly, the present invention relates to a system for providing and controlling a cursor used to select targets on a visual display in a computer system.

A number of visual display devices are in common use in computer systems. Among those systems are cathode rate tubes (CRTs) and liquid crystal displays (LCDs). While the particular type of display device is immaterial to the present invention, this section of the document contains a short description of these common display devices for the purposes of general clarity.

In a CRT, an electron beam is deflected by a magnetic field such that it impinges on elements of phosphorous which are arranged as a matrix behind a computer screen. Impingement of the electron beam on the phosphorous elements causes the phosphorous to change state and to thus release photons. In order to obtain a color display, separate electron beams (typically red, blue and green electron beams) are used to strike separate phosphorous elements arranged in the matrix. This combination of primary colors is used to obtain different colors in the visual display.

Similarly, LCDs typically have a layer of liquid crystal material elements arranged in a matrix. A matrix of electrodes is arranged on either side of the liquid crystal layer, such that electrodes contact both sides of each liquid crystal element in the liquid crystal array. A polarizer layer is provided on an input side of the liquid crystal matrix and an analyzer layer is provided on an output side of the liquid crystal matrix. Both the polarizer layer and the analyzer layer have linear polarizing elements. The liquid crystal material in the liquid crystal matrix changes the orientation of light passing therethrough based upon a signal applied to the liquid crystal elements by the electrodes in the electrode arrays. The light transmitted through the liquid crystal layer is analyzed by the analyzer layer and is used to generate the visual display. As with CRTs, LCDs typically have three or more liquid crystal display subpixel elements (typically red, green and blue) corresponding to each position in the liquid crystal matrix. These subpixel elements are energized in order to obtain a color display.

While many other types of displays can also be used with computer systems, LCDs and CRTs are currently in wise use and have therefore been discussed simply for purposes of illustration.

In order to generate a display, a coordinate system which is associated with a display matrix is typically set up in the memory of the computer system. In many conventional computer systems, the coordinate system is three-dimensional. Thus, a set of coordinates defines a point in the coordinate system. Images to be displayed on the display screen, which are larger than a single point, are defined by a set of points in the coordinate system, wherein each point is defined by a set of coordinates. Since the coordinate system is often three dimensional, images can be overlaid, over one another in the coordinate system and can thus give an overlaid appearance on the display screen.

User input devices (one example of which is a point and click device often referred to as a mouse) typically allow the user to physically manipulate the device and thus cause a cursor to move across the visual display in a corresponding manner. The computer system receives position information from the mouse, based upon the user's physical manipulation of the mouse, and causes a pointer in the coordinate system to move through various positions in the coordinate system based upon the position information. The position of the pointer in the coordinate system defines where on the display the cursor is to be displayed.

A typical mouse also has an actuation input, such as a button, which allows the user to select a target which is also represented by an image on the visual display. The user places a "hot spot" associated with the mouse cursor within an active region of a desired target to acquire the target and depresses the actuation input to select the target. While the mouse cursor is typically defined by a two-dimensional area within the coordinate system (e.g., a 32×32 two-dimensional grid in the coordinate system) the so called "hot spot" of the mouse cursor is only a single point in the coordinate system. Therefore, in order for the user to select a target, the single point in the coordinate system defining the hot spot must be within the bounds of the active region associated with the target in the coordinate system when the actuation button is depressed by the user. In other words, the user must place the individual point which represents the cursor hot spot into the target before the target is selected or acquired and before the target can receive any event from the pointing device.

This type of model leads to suboptimal target acquisition. Often, the targets are large and are spaced relatively large distances from one another on the screen (and hence in the coordinate system maintained in the memory of the computer system). Yet, since the hot spot of the mouse cursor is only a single point in the coordinate system, in order to select a target, the user must exercise a relatively high degree of precision, which increases user fatigue.

One conventional approach to addressing this problem has been to increase the size of the targets. However, in many cases, this can be contradictory to visual design aesthetics. Another conventional method of attempting to solve the problem is to maintain the graphic depiction of the target small, but make the target sensitive area (or active area) larger. This also fails to solve the present problem because users tend to manipulate the pointing device with the same amount of precision which is impliedly required by the user interface graphical representations. Thus, in the latter case, the user tends to manipulate the pointing device with unneeded precision in order to acquire small visual targets, resulting in lower acquisition speed and higher fatigue.

SUMMARY OF THE INVENTION

The present invention addresses problems associated with the prior art by effectively increasing the size of the hot spot associated with the mouse cursor.

A system controls acquisition of visual targets with a cursor in a visual display displayed on a screen. A coordinate system is provided which is associated with the screen. A pointer is also provided which is associated with the cursor and which comprises a plurality of cursor points in the coordinate system. The pointer is moved within the coordinate system based on position information from a user input device. A selectable target region is provided in the coordinate system. The target region corresponds to a visual target and comprises at least one target coordinate in the coordinate system. The target region is acquired when at least one of a plurality of the cursor points coincide with the target region.

In accordance with another aspect of the present invention, a system is provided for reconciling among a plurality of target regions which coincides with the cursor points.

DETAILED DESCRIPTION OF THE PREFERRED EMBODIMENTS

The present invention provides an enlarged cursor hot spot. This allows a system employing the present invention to acquire a target when any portion of the hot spot is over any portion of the active region of the target. The present invention also provides a system for reconciling one of a plurality of possible targets.

Figure 1:
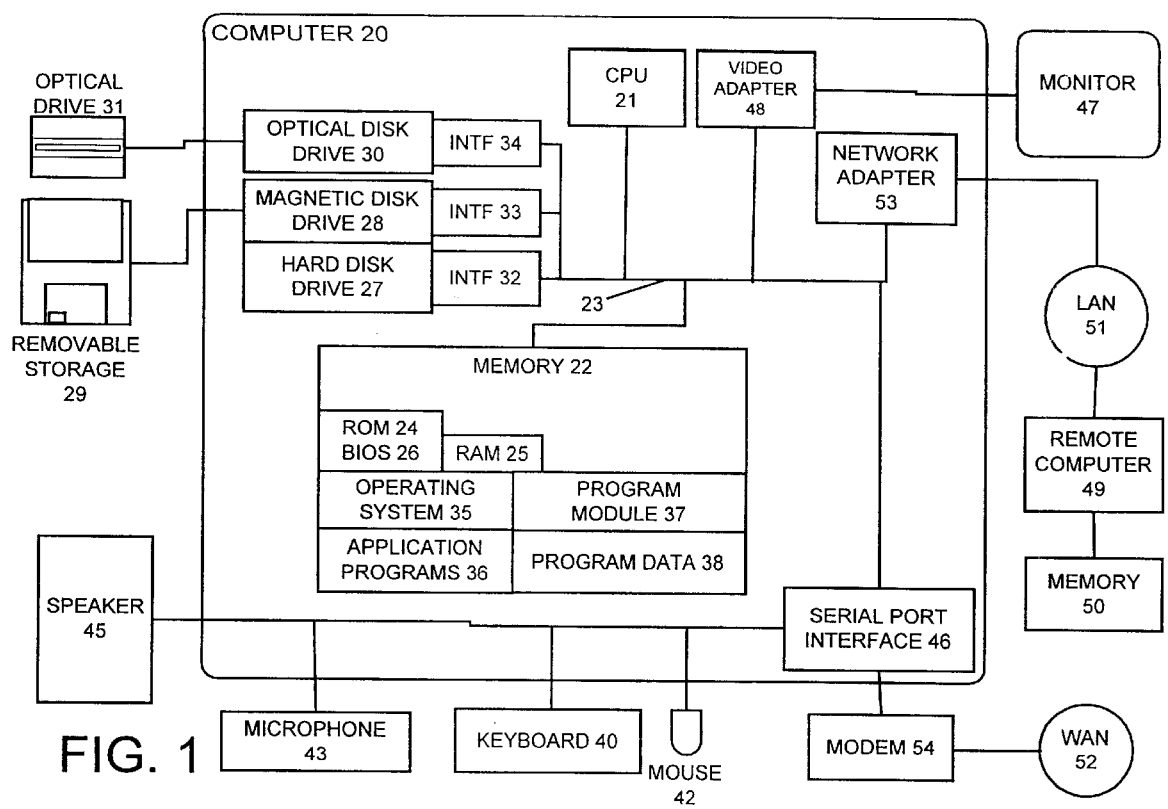
FIG. 1 is a block diagram of an exemplary environment for implementing a system in accordance with the present invention.

FIG. 1 and the related discussion are intended to provide a brief, general description of a suitable computing environment in which the invention may be implemented. Although not required, the invention will be described, at least in part, in the general context of computer-executable instructions, such as program modules, being executed by a personal computer. Generally, program modules include routine programs, objects, components, data structures, etc. that perform particular tasks or implement particular abstract data types. Moreover, those skilled in the art will appreciate that the invention may be practiced with other computer system configurations, including hand-held devices, multi-processor systems, microprocessor-based or programmable consumer electronics, network PCs, minicomputers, mainframe computers, and the like. The invention may also be practiced in distributed computing environments where tasks are performed by remote processing devices that are linked through a communications network. In a distributed computing environment, program modules may be located in both local and remote memory storage devices.

With reference to FIG. 1, an exemplary system for implementing the invention includes a general purpose computing device in the form of a conventional personal computer 20, including processing unit 21 (which may include one or more processors), a system memory 22, and a system bus 23 that couples various system components including the system memory to the processing unit 21. The system bus 23 may be any of several types of bus structures including a memory bus or memory controller, a peripheral bus, and a local bus using any of a variety of bus architectures. The system memory includes read only memory (ROM) 24 a random access memory (RAM) 25. A basic input/output 26 (BIOS), containing the basic routine that helps to transfer information between elements within the personal computer 20, such as during start-up, is stored in ROM 24. The personal computer 20 further includes a hard disk drive 27 for reading from and writing to a hard disk (not shown) a magnetic disk drive 28 for reading from or writing to removable magnetic disk 29, and an optical disk drive 30 for reading from or writing to a removable optical disk 31 such as a CD ROM or other optical media. The hard disk drive 27, magnetic disk drive 28, and optical disk drive 30 are connected to the system bus 23 by a hard disk drive interface 32, magnetic disk drive interface 33, and an optical drive interface 34, respectively. The drives and the associated computer-readable media provide nonvolatile storage of computer readable instructions, data structures, program modules and other data for the personal computer 20.

Although the exemplary environment described herein employs a hard disk, a removable magnetic disk 29 and a removable optical disk 31, it should be appreciated by those skilled in the art that other types of computer readable media which can store data that is accessible by a computer, such as magnetic cassettes, flash memory cards, digital video disks, Bernoulli cartridges, random access memories (RAMs), read only memory (ROM), and the like, may also be used in the exemplary operating environment.

A number of program modules may be stored on the hard disk, magnetic disk 29, optical disk 31, ROM 24 or RAM 25, including an operating system 35, one or more application programs 36, other program modules 37, and program data 38. A user may enter commands and information into the personal computer 20 through input devices such as a keyboard 40 and pointing device 42 or microphone 43. Other input devices (not shown) may include a joystick, game pad, satellite dish, scanner, or the like. These and other input devices are often connected to the processing unit 21 through a serial port interface 46 that is coupled to the system bus, but may be connected by other interfaces, such as a parallel port, game port or a universal serial bus (USB). A monitor 47 or other type of display device is also connected to the system bus 23 via an interface, such as a video adapter 48. In addition to the monitor 47, personal computers may typically include other peripheral output devices (not shown), such as speakers and printers.

The personal computer 20 may operate in a networked environment using logic connections to one or more remote computers, such as a remote computer 49. The remote computer 49 may be another personal computer, a server, a router, a network PC, a peer device or other network node, and typically includes many or all of the elements described above relative to the personal computer 20, although only a memory storage device 50 has been illustrated in FIG. 1. The logic connections depicted in FIG. 1 include a local are network (LAN) 51 and a wide area network (WAN) 52. Such networking environments are commonplace in offices, enterprise-wide computer network intranets and the Internet.

When used in a LAN networking environment, the personal computer 20 is connected to the local area network 51 through a network interface or adapter 53. When used in a WAN networking environment, the personal computer 20 typically includes a modem 54 or other means for establishing communications over the wide area network 52, such as the Internet. The modem 54, which may be internal or external, is connected to the system bus 23 via the serial port interface 46. In a network environment, program modules depicted relative to the personal computer 20, or portions thereof, may be stored in the remote memory storage devices. It will be appreciated that the network connections shown are exemplary and other means of establishing a communications link between the computers may be used.

Figure 2:
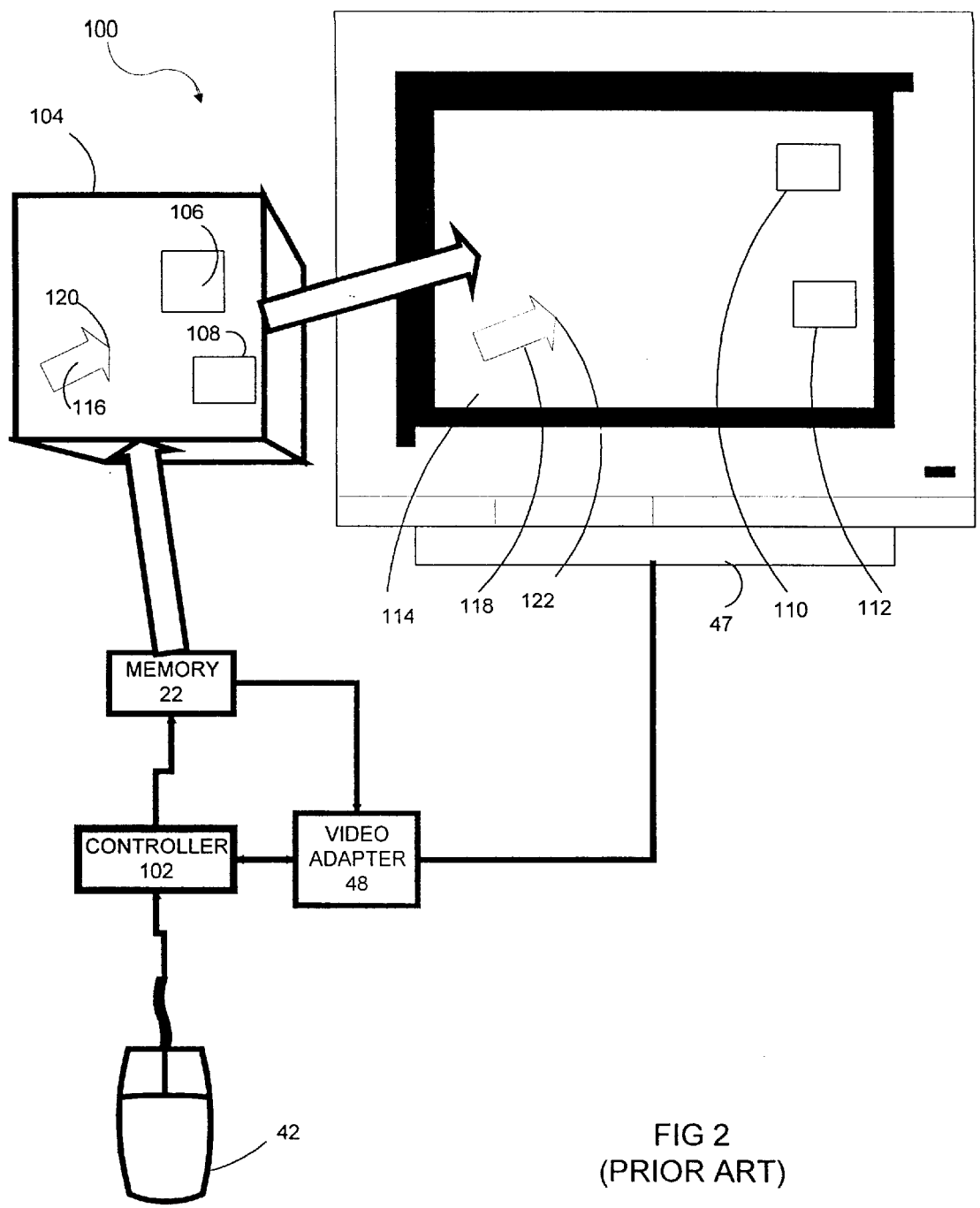
FIG. 2 is a more detailed block diagram illustrating the operation of a system in accordance with the prior art.

FIG. 2 is a more detailed block diagram of a system 100 implemented in accordance with the prior art. Some items are similar to those found in FIG. 1 and are correspondingly numbered. System 100 includes mouse 42, controller 102, memory 22, video adapter 48 and monitor 47. In addition, FIG. 2 illustrates a coordinate system 104 which is maintained in memory 22. Controller 102 may be implemented as controller 21 shown in FIG. 1, or as a separate dedicated controller or another controller.

Coordinate system 104 is typically a three dimensional coordinate system maintained by controller 102 in memory 22. Three-dimensional coordinate system 104 typically has targets 106 and 108 stored therein which represent visual target images 110 and 112 being displayed on screen 114 of monitor 47. Targets 106 and 108 may typically be defined by a set of points in coordinate system 104, each target point being defined by a set of target coordinates. The set of target points may typically coincide with the boundary of targets 106 and 108. The location of the targets in coordinate system 104 indicates where, on the display screen 114, the corresponding visual target images 110 and 112 are displayed. Since coordinate system 104 is three dimensional, images can be displayed on display screen 114 such that they have a layered appearance.

Three-dimensional coordinate system 104 also typically includes cursor 116 which is associated with a visual cursor image 118 displayed on screen 114. Cursor 116 may typically be defined by a set of cursor points in coordinate system 104, each cursor point being defined by a set of cursor coordinates. The set of cursor points may illustratively define the boundary of cursor 116. The location of the cursor in coordinate system 104 indicates where, on the display screen 114, visual cursor image 118 is displayed, in a known manner.

a user typically manipulates mouse 42. Mouse 42 contains a roller ball coupled proximate encoders (or other position input mechanisms) which provide position information to controller 102 based upon the physical manipulation of mouse 42 by the user. The position information is used by controller 102 to move object 116 within three-dimensional coordinate system 104. Video adapter 48 interacts with controller 102 and memory 22 to provide the necessary data to monitor 47 to generate desired images on display screen 114. This causes visual cursor image 118 to move about display screen 114 on monitor 47.

Cursor 116 typically has a hot spot which is represented by a single point 120 in coordinate system 104. Thus, hot spot 120 is also conventionally represented by a single pixel 122 on screen 114 of monitor 47. Consequently, in order for an image 110 or 112 on screen 114 to be acquired by the cursor, the user must place the single point 122 within the bounds of the sensitive region of target image 110 or 112 on screen 114 (which may be the entire image, a region smaller than the image or a region larger than the image). Then, in order for the visual target image 110 or 112 to receive an event from the cursor, the user must, for example, depress the actuator on mouse 42. Acquisition of targets in this manner can be inefficient in that it requires a relatively high degree of precision which is often unneeded. In other words, where target images 110 and 112 are spaced a relatively large distance apart on screen 114, there is no need for the hot spot 122 to be associated with only a single point on screen 114, or a single point in coordinate system 104. That degree of precision is simply unnecessary. By requiring the user to exercise such precision, the system operates to decrease efficiency and increase user fatigue.

Figure 3:
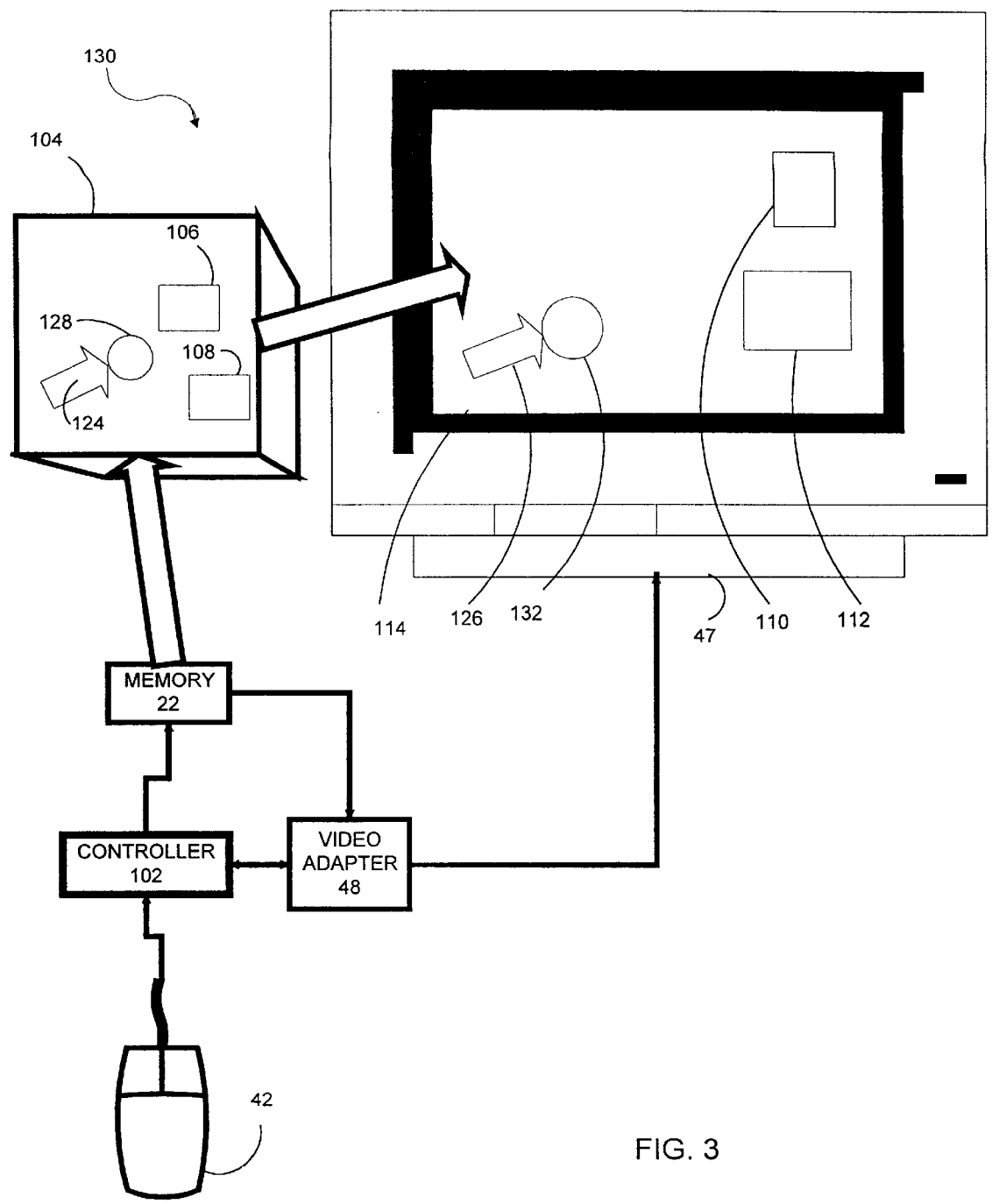
FIG. 3 is a more detailed bock diagram illustrating the operation of one preferred embodiment of the present invention.

FIG. 3 is a more detailed block diagram of a system 130 in accordance with one embodiment of the present invention. A number of items are similar to those found in FIG. 2, and are correspondingly numbered. However, system 130 provides cursor 124 in coordinate system 104 which is associated with cursor image 126 displayed on screen 114 of monitor 47. Rather than providing only a single point in coordinate system 104 (and thus a single point on screen 114), the present invention provides the cursor hot spot as a plurality of hot spot points which define a hot spot (and shown as a circular hot spot area) 128 in coordinate system 104. The location of the hot spot 128 in coordinate system 104 indicates where, on display screen 114, a corresponding visual hot spot image 132 is displayed. It should be noted that, while a two-dimensional area of hot spot points 128 has been shown in coordinate system 104 in FIG. 3, the present invention contemplates any hot spot being defined by more than one point in coordinate system 104. For example, the hot spot points 128 could define a line, a two-dimensional area, or a three dimensional space in coordinate system 104.

In any case, in order to acquire a target image 110 or 112 on screen 114, the user now simply needs to manipulate mouse 42 in order to position any portion of visual hot spot image 132 within any portion of the active region of visual target image 110 or 112. In order to select the target, the user than exercises an appropriate actuation of mouse 42.

Manipulation of mouse 42 causes controller 102 to interact with memory 22 to move cursor object 124 within coordinate system 104 in a known manner. When any part of hot spot 128 coincides with any portion of targets 106 and 108, that particular target is acquired and the user need simply provide an actuation signal from mouse 42 in order to select the acquired target 106 or 108 in coordinate system 104.

It should also be noted that the sensitive areas of visual target images 110 and 112 can be any suitable area either within or outside of the actual image displayed on screen 114. The actual sensitive area of the target image is immaterial to the present invention. By providing a visual hot spot image 132 which is larger than a single point, the present invention greatly increases efficiency in target acquisition and reduces user fatigue in target selection.

Also, in a preferred embodiment, controller 102 interacts with memory 22 and video adapter 48 such that, as soon as any portion of visual hot spot image 132 coincides with any portion of visual target image 110 or 112 (i.e., when a target is acquired), the appearance of the visual target image 110 or 112 changes to give the user a visual indication of that acquisition. The user can then actuate mouse 42 to select the acquired visual target image 110 or 112 which coincides with a portion of visual hot spot image 132. Of course, in a preferred embodiment, corresponding movement of objects within coordinate system 104 also occurs. In other words, as the user moves mouse 42, cursor 124 is moved about within coordinate system 104 until any portion of hot spot 128 coincides with any of the active regions of target 106 or 108. Once such coincidence occurs, the visual appearance of the visual target image 110 or 112 associated with the coincident target 106 or 108 preferably changes to give the user a visual indication that the coincidence is then occurring. The user can then actuate mouse 42 to select the acquired target.

It should be noted that actuating a target using a mouse button is not central to the present invention. Rather, the present invention is more closely directed to target acquisition. Any of many different events can be sent to the target once it is acquired. Some such events include buttonclick, buttondown, buttondoublekick, mouseover, mouseleave, buttonup, wheelroll, etc.

Figure 4:
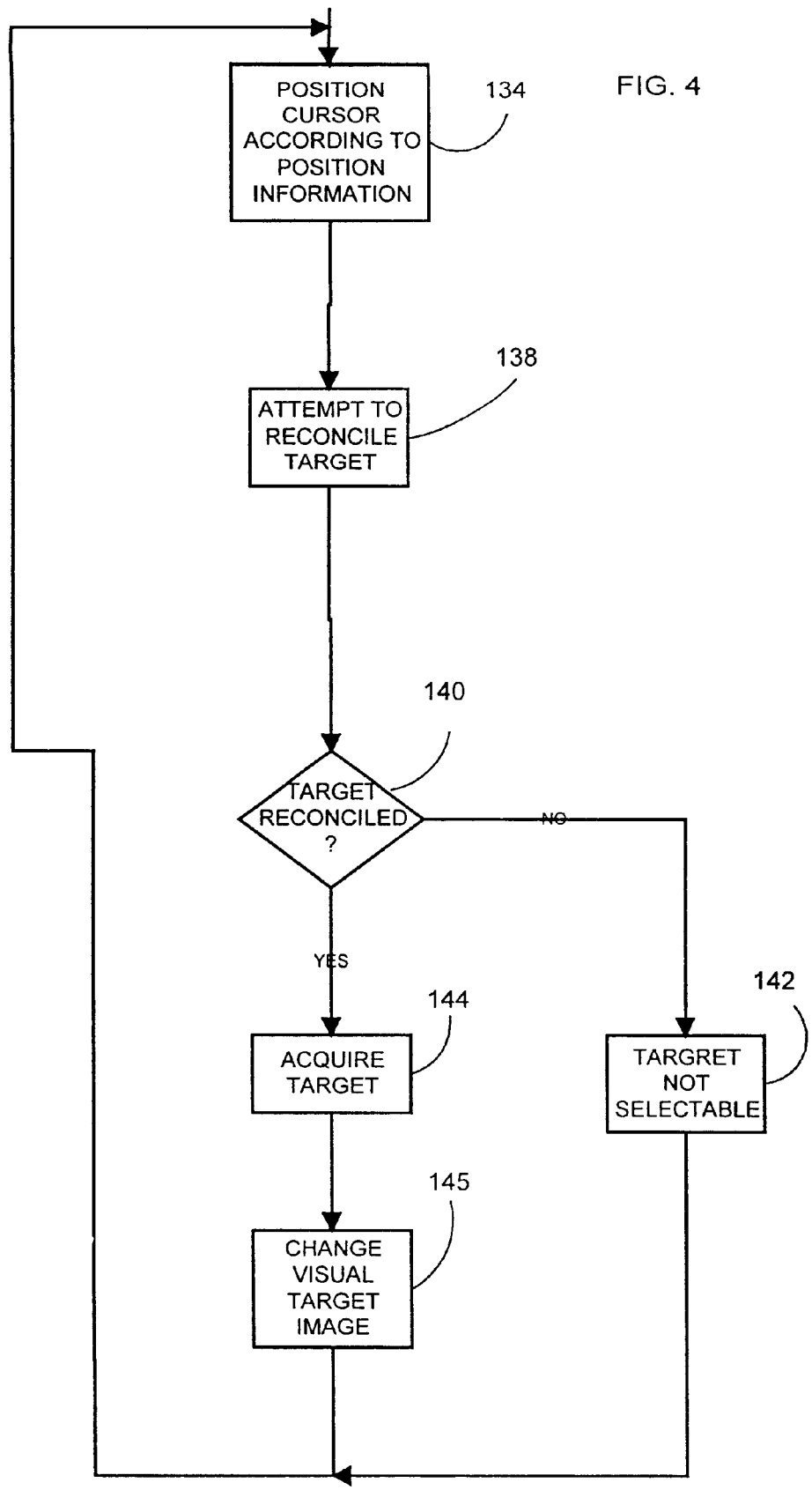
FIG. 4 is a flow diagram illustrating operation in accordance with one preferred embodiment of the present invention.
Figure 5:
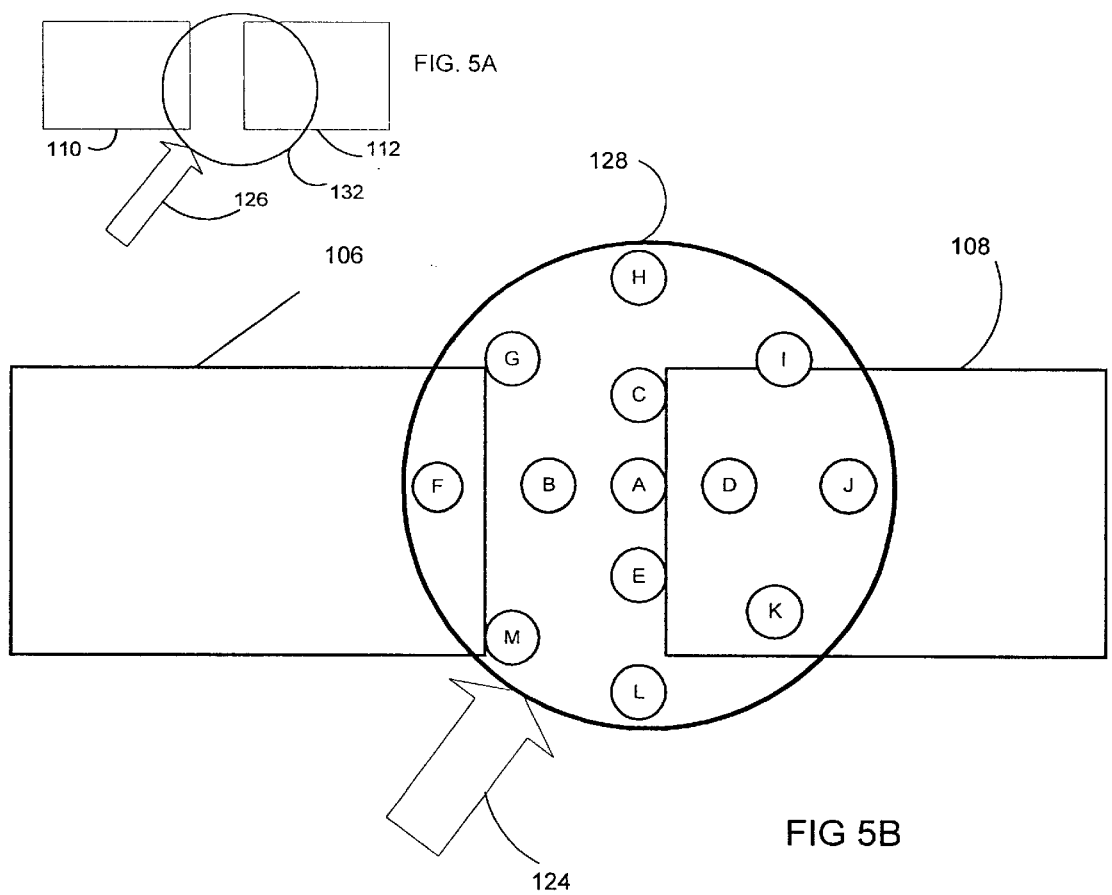
FIG. 5 is an illustration of the operation of the present system to implement target reconciliation in accordance with one aspect of the present invention.

FIG. 4 is a flow diagram illustrating target acquisition and selection in accordance with one preferred embodiment of the present invention. Controller 102 first interacts with memory 22 to position cursor 124 in accordance with position information received from mouse 42. This is indicated by block 134. System 130 attempts to reconcile or acquire a target. This can be done in any number of suitable ways, including those discussed with respect to FIGS. 5–7. Essentially, system 130 determines whether any portion of a target 106 and 108 coincides with any portion of hot spot 128. This can also be discussed in terms of display screen 114. Briefly, system 130 determines whether any portion of the active region of visual target images 110 and 112 is coincident with any portion of visual hot spot image 132 on screen 114. If so, a target is acquired and can receive an event from mouse 42.

Since visual hot spot image 132 is no longer represented by only a single pixel on display screen 114 (or a single point in coordinate system 104) there is a potential that two or more visual target images could have active regions which are coincident with portions of visual hot spot image 132 on screen 114. In that case, system 132 reconciles among those two or more targets in order to choose which of the targets will be acquired and receive the event generated by mouse 42. Attempted reconciliation of the target is indicated by block 138.

It should be noted that attempted target reconciliation of block 138 can be attempted without receiving an actuation signal or other event from mouse 42. The simple act of moving the cursor position can cause system 130 to attempt to reconcile to a target. Next, system 130 determines whether a target has actually been reconciled. In other words, if no visual target images coincide with hot spot image 132, then no target can be reconciled. Therefore, if the user actuates one of the buttons on mouse 42, no objects will consume, or receive, the event generated by actuation of mouse 42. In that case, system 130 will determine that a target is not selectable and processing will simply continue at block 134. This is indicated by blocks 140 and 142.

Once system 130 has reconciled a target, the target is acquired. This is indicated by block 144. The visual image of the acquired target is changed to provide the user with a visual indication that a target has been acquired. This is indicated by block 145.

When a target is acquired, a desired event is delivered to that target by actuation of the mouse button. The acquired target receives, or consumes, the event generated by actuation of mouse 42. Again, processing continues at block 134 where system 130 waits for the user to again change the position of the cursor. This is indicated by blocks 140 and 144.

FIG. 5A illustrates one preferred embodiment of a target reconciliation method in accordance with the present invention. In FIG. 5A, the active regions of visual target images 110 and 112 are illustrated. Those active regions, in FIG. 5A, are shown separated by a distance which is less than the diameter of visual hot spot image 132. Thus, in the arrangement shown in FIG. 5A, it is possible that the operator could move mouse 42 to position visual hot spot image 132 over the active regions corresponding to both visual target images 110 and 122, at the same time. This also means that in coordinate system 104, portions of hot spot 128 coincide with both targets 106 and 108, as shown in FIG. 5B. In that case, it becomes necessary for system 130 to reconcile to one of targets 106 and 108.

FIG. 5B also illustrates that, in one preferred embodiment, hot spot 128 is comprised of a plurality of points A–M in coordinate system 104. In accordance with one preferred embodiment of the present invention, system 130 preferably starts at a point within hot spot 128 which is close to the center of hot spot 128. In the embodiment illustrated in FIG. 5B, system 130 preferably starts with point A and determines whether point A is positioned over any portion of either of targets 106 and 108. In order to do this, system 130 preferably sends a specialized event to the object under point A. The specialized event requires no action other than consumption by a sensitive region under point A and an indication that the event has been consumed by the object.

If the object does not consume the event, system 130 determines that the object is not selectable (because it has no sensitive region) and moves on to point B. System 130 again determines whether any of targets 106 and 108 are located at that point. System 130 preferably proceeds in a sequential fashion, from pixel A to pixel M, until an object consumes the event and notifies system 130 that it has consumed the event. System 130 then stops sending the event, since it has reconciled to, and acquired, a target.

Specifically, in the embodiment illustrated by FIG. 5B, system 130 sends an event to the objects under points A, B and C, which events are not consumed. System 130 then proceeds to send an event to the object under point B. Target 108 consumes that event, and notifies system 130 that the event has been consumed. System 130 has then reconciled to target 108 (since it was the first to consume the event), and stops sending the event.

Progression from point A through point M essentially results in a scanning-type of search pattern which takes the form of an outward spiral beginning at the center of hot spot 128 and ending at an exterior periphery of hot spot 128. Of course, it will be realized that other patterns can also be implemented. For example, system 130 can begin at one peripheral edge of hot spot 128 and progress directly across hot spot 128 toward an opposite edge thereof. System 130 can also start at a central region, such as point A and proceed to search radially outwardly in a single direction until the outer periphery of hot spot 128 is reached, and then to return to point A and search radially outwardly in the opposite, or another, direction until the outer periphery of hot spot 128 is reached. Further, next adjacent points need not be searched. For instance, the search can be directed to every other point, every third point, etc. . . .

In addition, rather than simply locating a first target 106 to 108 which consumes the event, system 130 can undertake to determine how much of the hot spot 128 coincides with target 106 and how much coincides with target 108. In that instance, system 130 preferably reconciles to the target 106 or 108 which has a largest region that corresponds to hot spot 128. Other techniques can also be used. For instance, system 130 can undertake to determine which of targets 106 and 108 has a generally central region which is closest to the generally central region of hot spot 128. In implementing such a search strategy, system 130 first defines the bounds of the targets 106 and 108 having portions lying within hot spot 128, and calculates a central region of those targets 106 and 108. System 130 then calculates the distance between the central region, defined in FIG. 5B by point A, of hot spot 128 and the central region determined for targets 106 and 108.

In any of the above cases, once system 130 has reconciled to a target object, system 130 preferably causes the visual appearance of the visual target image associated with that target object to change (such as to be highlighted) to give the user a visual indication as to which target object system 130 has acquired. This further increases the efficiency of the system and reduces user fatigue.

While FIG. 5B has been described with respect to the happenings in coordinate system 104, it will be appreciated that manipulation is also occurring on screen 114. In other words, where system 130 chooses point A and determines whether any target objects are under point A, system 130 is, in one preferred embodiment, preferably choosing a point defined as being within a central region of visual hot spot image 132 on display 114. System 130 then determines whether that point coincides with any portion of visual target image 110 or 112. Similar manipulation occurs with respect to the other steps described with respect to FIG. 5B.

Figure 6:
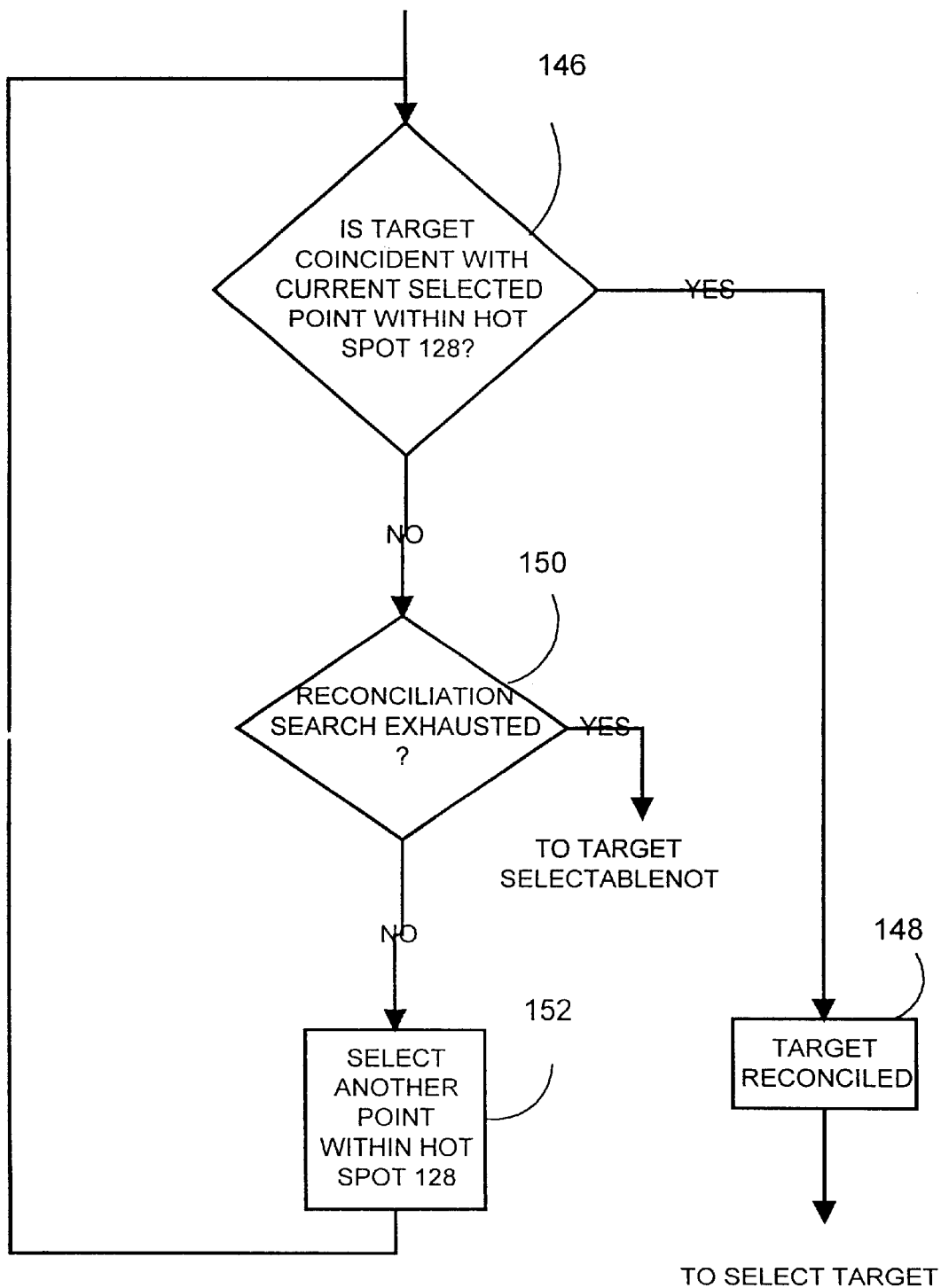
FIG. 6 is a flow diagram illustrating target reconciliation as discussed with respect to FIG. 5.
Figure 7:
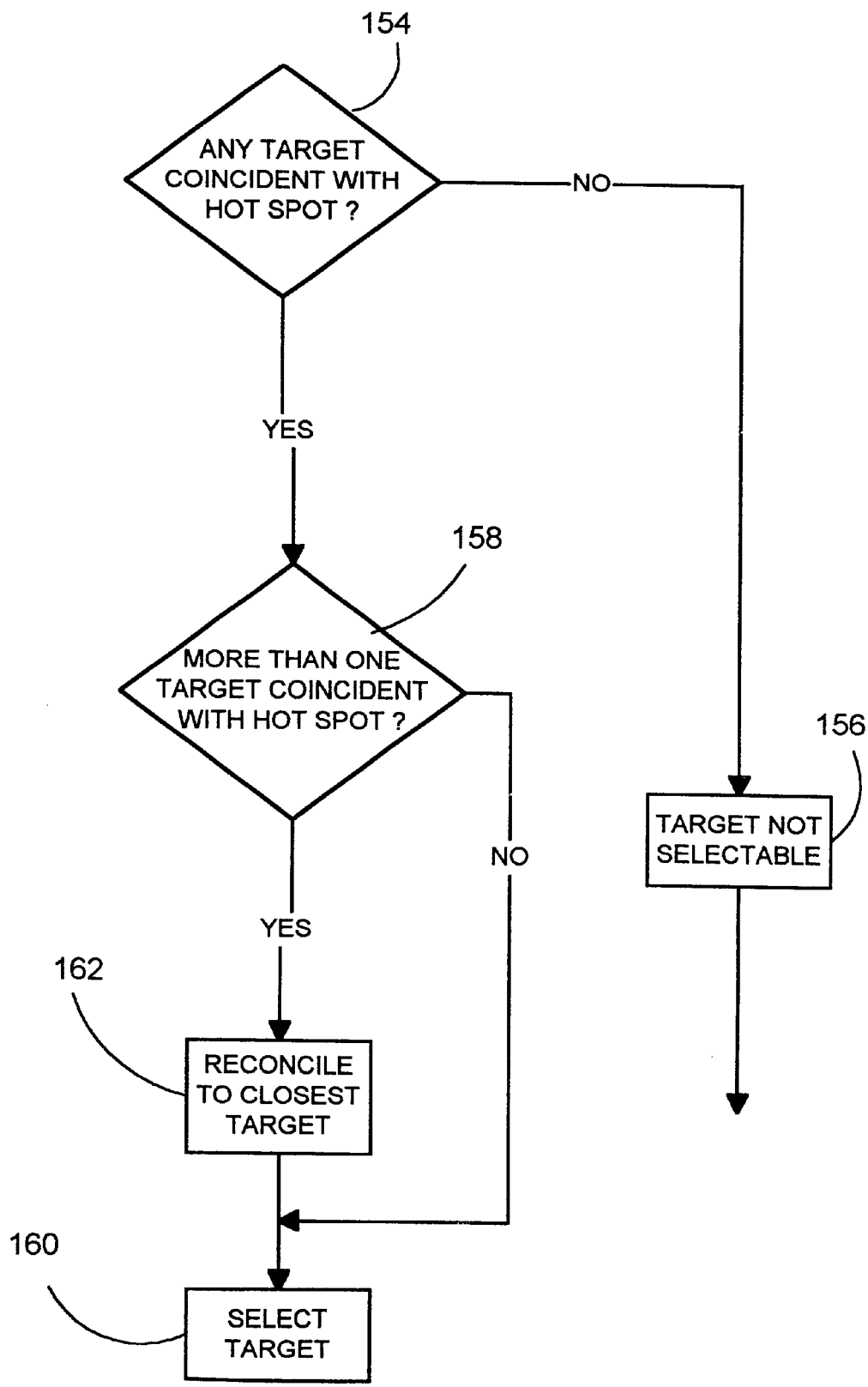
FIG. 7 is a flow diagram illustrating an alternative embodiment of target reconciliation in accordance with another aspect of the present invention.

FIGS. 6 and 7 are flow diagrams illustrating two preferred embodiments of target reconciliation in accordance with the present invention. It will be recognized that many other types of target reconciliation can be implemented in accordance with the present invention, but two are provided for illustrative purposes.

In FIG. 6, system 130 first determines whether a target object is coincident with a current selected location within hot spot 128. In the embodiment described with respect to FIG. 5B, the current selected location within hot spot 128 starts as point A. In order to determine whether any targets are coincident with portions of any point A, system 130 preferably sends the event described above to any objects coinciding with point A (i.e., with the current selected point within hot spot 128). If that object consumes the event, it notifies system 130 that the event has been consumed, and system 130 then determines that a target is coincident with point A within hot spot 128. That being the case, system 130 has reconciled a target and appropriate processing continues. This is indicated by blocks 146 and 148.

However, if system 130 determines that there is no target which is coincident with point A in hot spot 128, then system 130 determines whether the reconciliation search has been exhausted. In other words, system 130 determines whether there are any points A–M remaining for which coincidence has yet to be determined. If the reconciliation search has been exhausted, system 130 determines that no targets have portions of their active regions which are coincident with hot spot 128. Thus, a target is not selectable and appropriate processing continues. This is indicated by block 150.

If, at block 150, it is determined that the reconciliation search has not been exhausted, then system 130 selects another location within hot spot 128 and determines whether it is coincident with any target. In the embodiment illustrated by FIG. 5B, this is reflected by system 130 choosing point B to determine coincidence. Once the next point within hot spot 128 is chosen, coincidence is again determined. The selection of another point within hot spot 128 is indicated by block 152.

This process continues, according to the prescribed search pattern, until all points within hot spot 128 have been exhausted (at which point no target will be selected) or until target has been acquired.

FIG. 7 is a flow diagram which illustrates another preferred embodiment of target reconciliation in accordance with one aspect of the present invention. In FIG. 7, once the position of cursor 124 has been moved, system 130 determines whether any targets are coincident with hot spot 128. This can be done by simply scanning through various points within hot spot 128 to determine whether any targets are coincident with those points. This is indicated by block 154. If no targets are coincident, system 130 determines that a target is not selectable as indicated by block 156. However, if any targets are coincident with hot spot 128, system 130 determines whether more than one target is coincident with hot spot 128. If not, then the single target which is coincident with hot spot 128 is acquired for receiving an event. This is indicated by blocks 158 and 160.

However, if, at block 158, it is determined that more than one target is coincident with hot spot 128, then system 130 reconciles to the closest target. By closest, any suitable measure can be used, such as those described with respect to FIGS. 5A and 5B. For instance, system 130 can measure the difference between the center of the targets coincident with hot spot 128, and the center of hot spot 128. Based on that measure, system 130 can select the target which has its center located closest to the center of hot spot 128. In addition, system 130 can predefine a central region of hot spot 128 which corresponds to more than one point in coordinate system 104 (and possibly more than one pixel on screen 114). System 130 can also calculate a central region for all target objects which have active regions coincident with any locations in hot spot 128. In that instance, system 130 would not be measuring the distance from a single point in hot spot 128 to a single point in the active region of the targets, but would rather be measuring a distance from one region to another region.

Further, if either hot spot 128 or the active regions of the targets are irregular in shape, it can be preferable for system 130 to determine the amount or area of the active region of the target which is coincident with hot spot 128. In that instance, system 130 can reconcile to the target which has the greatest area coincident with hot spot 128. In any case, reconciliation by system 130 to the closest target is indicated by block 162 in FIG. 7.

Figure 8:
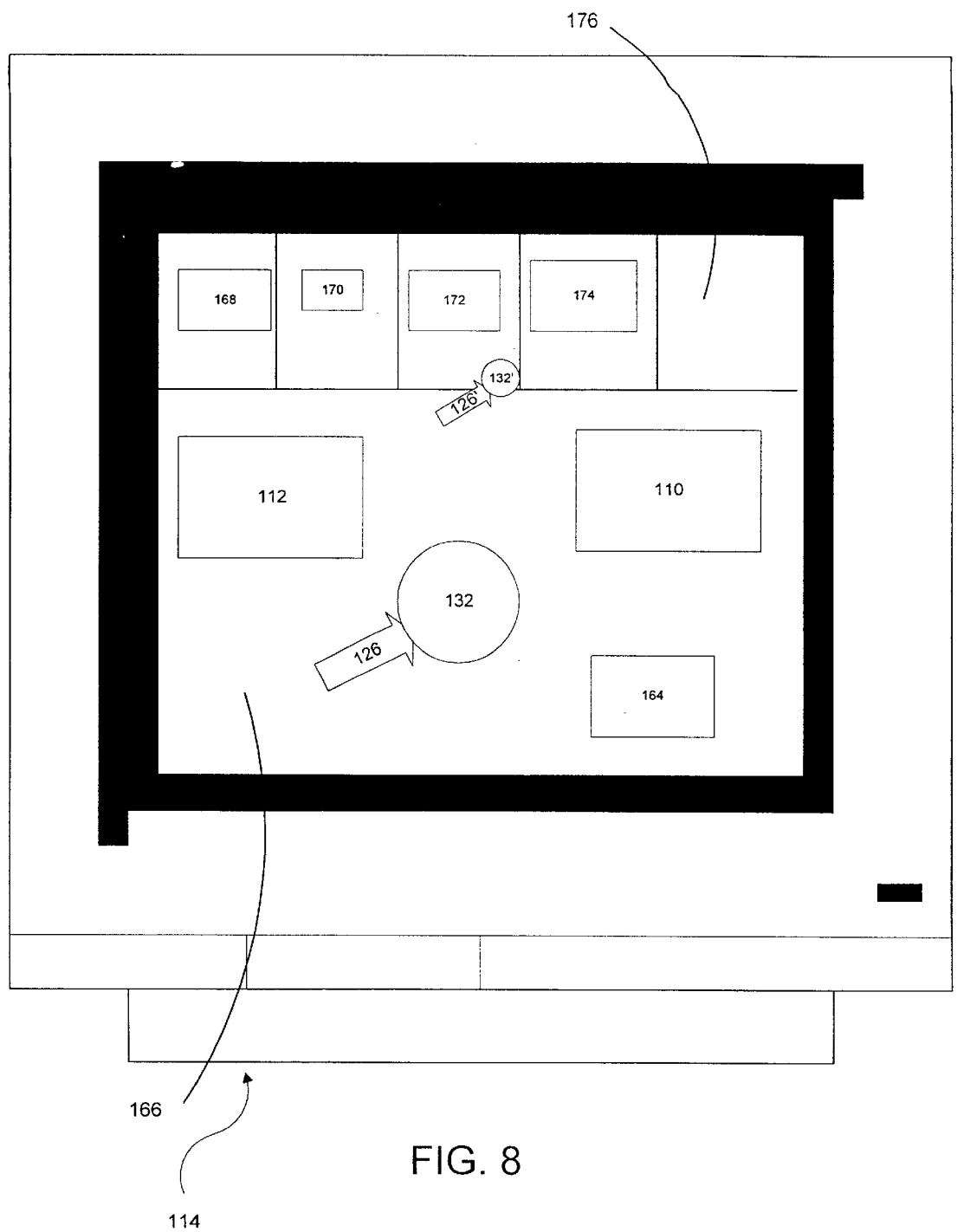
FIG. 8 illustrates an adaptive hot spot in accordance with another aspect of the present invention.

FIG. 8 is an illustration of another preferred aspect in accordance with the present invention in which the size of visual hot spot image 132 (and hence hot spot 128) is adaptable. FIG. 8 shows display screen 114 having a plurality of visual target images 110, 112, and 164 located in a first region 166 of screen 114, and a second plurality of visual target images 168, 170, 172 and 174 located in a second region 176 of screen 114. It can be seen that, in region 166, the visual target images 110, 112 and 164 (which can be represented by icons) are relatively large and spaced a large distance apart relative to the targets 168–174 in region 176. Visual images 168–174 are located closely proximate one another, and are relatively small. In one example, visual target images 110, 112 and 164 are icons representative of application programs which are supported by an operating system, such as a WINDOWS brand operating system. Visual target images 168–174 are icons associated with a tool bar in region 176 which is also supported by an operating system, such as a WINDOWS brand operating system. Of course, it will be recognized that the targets can also be visual images displayed by an application program, such as a computer aided design (CAD) program, or any other program which runs on computer 20.

In accordance with one preferred aspect of the present invention, the program which supports cursor 126 interacts with the program supporting the targets. In that instance, system 130 is programmed to adapt the size of visual hot spot image 132 (and hence hot spot 128) based on the size and spacing of the visual target images in the region proximate cursor 126. Therefore, when cursor 126 is in region 166 of screen 114, where the visual targets 110, 112 and 164 are relatively large and spaced far apart, system 130 adjusts the size of hot spot 132 to be relatively large, as shown in FIG. 8. However, when the user manipulates mouse 42 to position cursor 126 at the position of cursor 126' in FIG. 8, system 130 interacts with the program supporting targets 168–174 and determines that those targets are relatively small, and are spaced closely proximate one another. In that instance, having hot spot 132 sized relatively large may not be desirable. This may specifically be the case, for instance, where the program supporting targets 168–174 is a CAD program which has very small objects, such as lines, which are closely spaced relative to one another. Having hot spot 132 sized relatively large could actually lead to inefficiency in the system. Therefore, in accordance with one aspect of the present invention, system 130 adapts the size of hot spot 132 to that shown as 132' in FIG. 8, as soon as cursor 126 enters region 176, and moves to the position of cursor 126' shown in FIG. 8.

Figure 9:
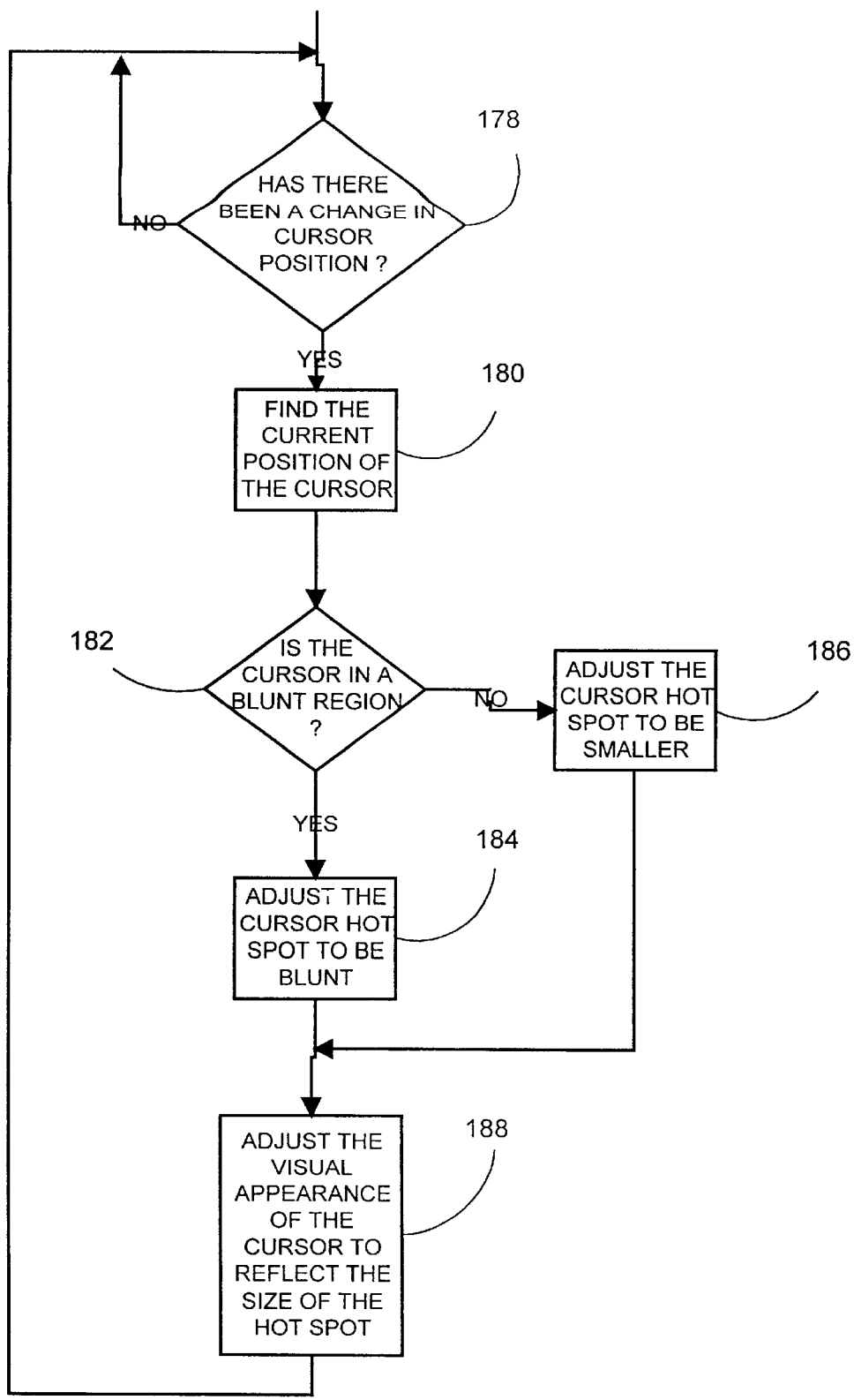
FIG. 9 is a flow diagram illustrating adjustment of the hot spot as discussed with respect to FIG. 8.

FIG. 9 is a flow diagram illustrating the adaptation of the size of hot spot 132. Again, it should be noted that this operation can be provided by either the operating system, or an application program running on computer 20.

The program first monitors the cursor position to detect a change in cursor position. This is indicated by block 178. If the cursor position has changed, the program accesses the particular new position of the cursor as indicated by block 180. The program then determines whether the cursor is in the blunt cursor region where the targets are spaced relatively far apart from one another, and are relatively large, such as region 166 shown in FIG. 8. This is indicated by block 182. If the cursor is in a blunt cursor region, the size of hot spot 132 is adjusted accordingly. In one embodiment, the size of hot spot 132 corresponds to an area of 32×32 pixels. This is indicated by block 184.

However, if the cursor is not in a blunt cursor region, then the size of hot spot 132 is also adjusted accordingly. In one embodiment, hot spot 132 is adjusted down to a point represented by a single pixel. This is indicated by block 186.

Once the size of hot spot 132 has been adjusted, the visual appearance of hot spot 132 is also preferably adjusted on screen 114 so that the user is provided with a visual indication as to the size of hot spot 132. This allows the user to easily exercise the precision required when cursor 126 is in any particular region of screen 114. This is indicated by block 188.

Figure 10:
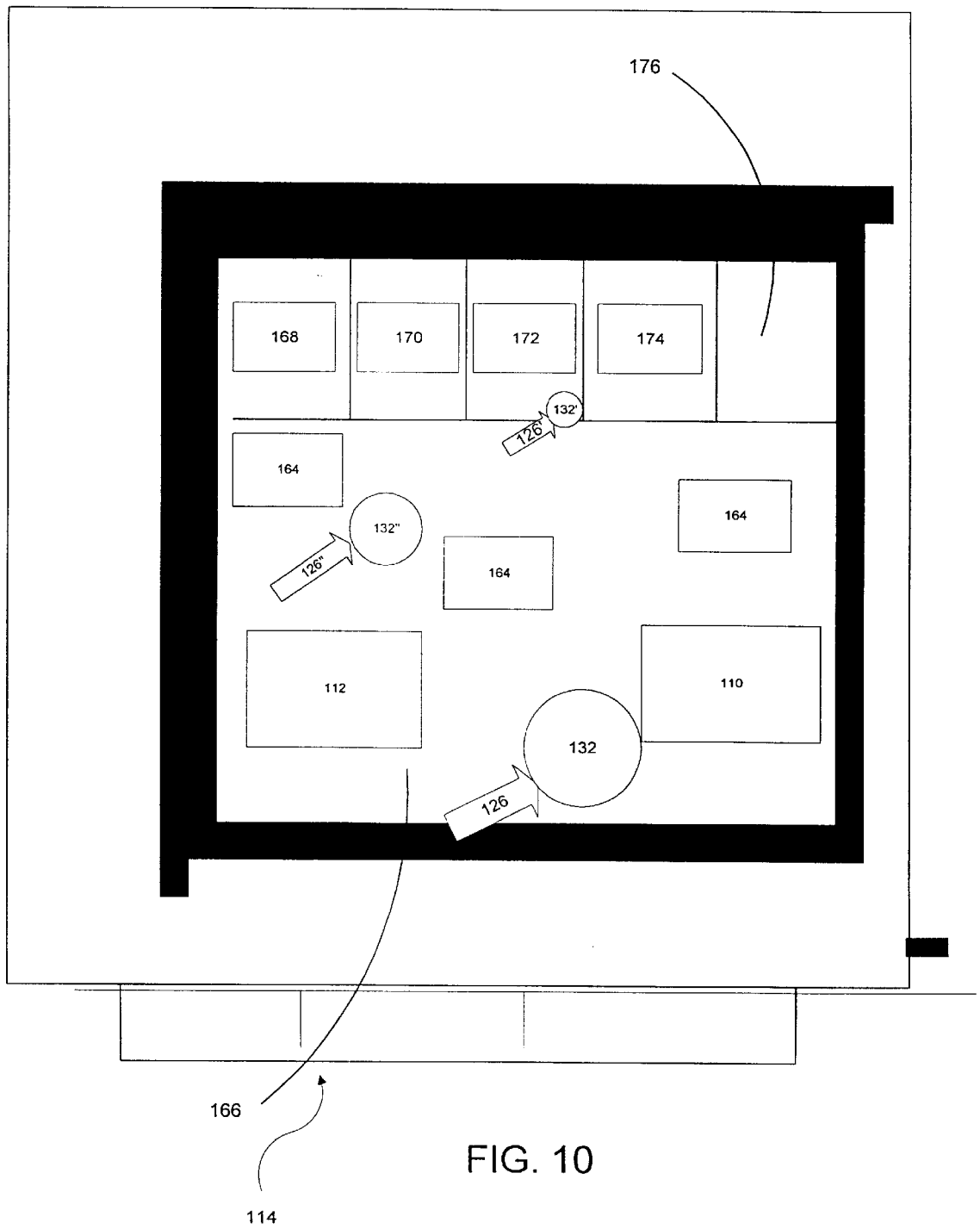
FIG. 10 illustrates another embodiment of an adaptive hot spot in accordance with another aspect of the present invention.

FIG. 10 is another illustration of display screen 114 which is similar to that shown in FIG. 8, and similar items are similarly numbered. However, FIG. 10 also illustrates that display screen 114, in addition to having region 166 and 176, also has an intermediate region 190. Whereas, in region 166, targets 110 and 112 are relatively large and spaced apart, and whereas in region 176 targets 168–174 are relatively small and spaced closely proximate one another, region 190 is an intermediate region. The targets in region 190 are spaced more closely together than those in region 166, but are spaced further apart than those in region 176. Therefore, the present system provides a cursor 126" which has a hot spot 132". Hot spot 132" has been adapted to be smaller than hot spot 132, but larger than hot spot 132'. Of course, any suitable number of regions can be provided on any particular display screen 114.

Figure 11A:
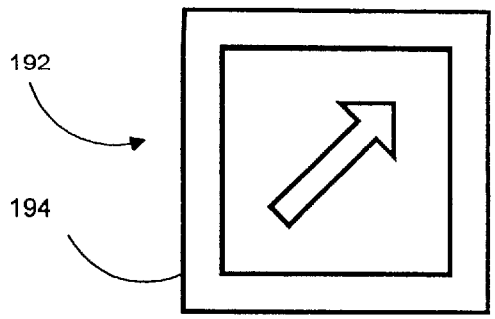
FIGS. 11A–11D illustrate various depictions of blunt cursors employed by the present invention.
Figure 11D:
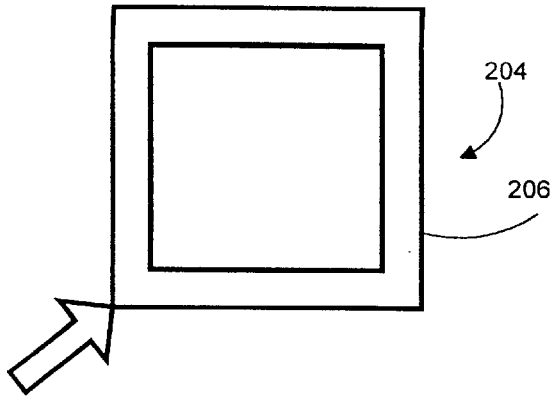
Figure 11C:
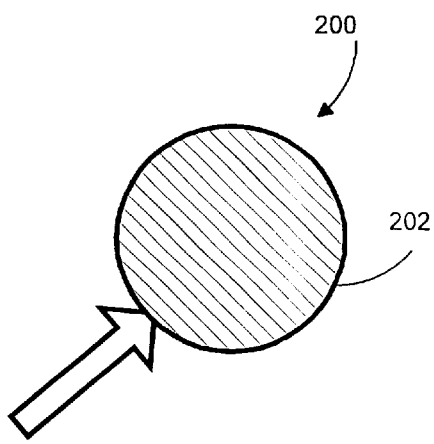
Figure 11B:
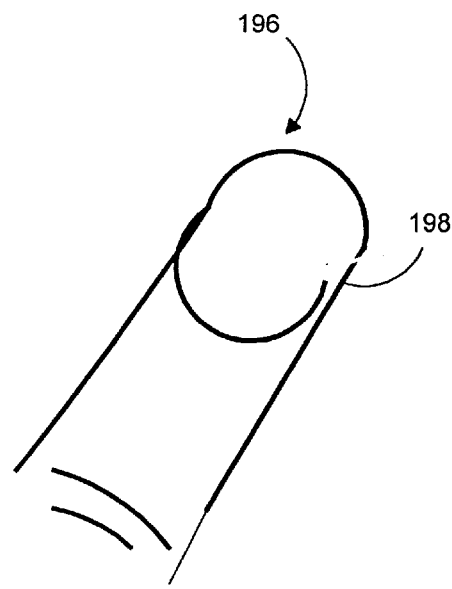

FIGS. 11A–11D illustrate various embodiments of a blunt cursor in accordance with the present invention. In FIG. 11A, blunt cursor 192 is provided which has a hot spot defined by an exterior periphery 194 thereof. FIG. 11B provides cursor 196 which has a hot spot generally defined by a fingernail region 198 of a finger. FIG. 11C illustrates a cursor 200 which has a hot spot 202 which is shaded, or provided with a halo effect (which resembles a spotlight). FIG. 11D provides a cursor 204 which is similar to that shown in FIG. 11A, but which has the arrow removed from within the exterior periphery 206 which defines the hot spot of cursor 204. The hot spot has a transparent interior region.

Therefore, it can be seen that the present invention provides a cursor having a hot spot which has dimension, rather than being a single point. By increasing the size of the hot spot of the cursor to a desired level, this greatly increases the efficiency and reduces the required precision with which targets are acquired using the cursor. This also reduces the user fatigue associated with acquiring targets. Further, the present invention provides the ability to adaptively change the size of the cursor to meet the needs of any specific application. This can be implemented by the application program, or by the operating system. Thus, the application developer can choose to trade off efficiency for greater precision, if the application requires it. The present invention also provides a suitable system for acquiring a target among a plurality of coincident targets.

Although the present invention has been described with reference to preferred embodiments, workers skilled in the art will recognize that changes may be made in form and detail without departing from the spirit and scope of the invention.

What is claimed is:

1. A method of controlling acquisition of visual targets with a cursor in a visual display displayed on a screen, comprising:

providing a coordinate system associated with the screen;

providing a pointer associated with the cursor and comprising cursor points in the coordinate system;

moving the pointer within the coordinate system based on position information from a user input device;

providing a target region in the coordinate system, the target region corresponding to a visual target and comprising at least one target point in the coordinate system;

providing, substantially continuously, visual indicia on the visual display indicative of at least some of a plurality of cursor points defining a cursor hot spot; and acquiring the target region when any of a plurality of the cursor points defining the cursor hot spot coincides with the at least one target point.

2. The method of claim 1 and further comprising:

providing visual indicia on the visual display indicative of all of the cursor points defining the cursor hot spot.

3. The method of claim 1 and further comprising:

changing a number of the plurality of cursor points defining the cursor hot spot.

4. The method of claim 3 and further comprising:

maintaining cursor position information indicative of a current pointer position in the coordinate system; and changing the number of the plurality of cursor points defining the cursor hot spot based on predetermined locations in the coordinate system and the pointer position.

5. The method of claim 1 and further comprising:
changing the number of the plurality of cursor points defining the cursor hot spot based on a size of targets in the coordinate system proximate a current position of the pointer in the coordinate system.

6. The method of claim 3 and further comprising:
changing a cursor display displayed on the display screen based on a change in the number of the plurality of cursor points defining the cursor hot spot.

7. The method of claim 1 and further comprising:
changing a visual indicia indicative of the visual target when the target point coincides with at least one point in the cursor hot spot.

8. The method of claim 1 wherein the coordinate system includes a plurality of sets of target coordinates, each set corresponding to one of a plurality of targets, and wherein acquiring the target region, comprises:
determining which of the sets of target coordinates is located closest to the cursor hot spot; and
acquiring a target having coordinates closest to the cursor hot spot.

9. The method of claim 8 wherein determining which of the sets of targets coordinates is located closest, comprises:
determining which of the sets of target coordinates is located closest in the coordinate system to a generally central point.

10. The method of claim 1 wherein the coordinate system includes a plurality of sets of target coordinates, each set corresponding to one of a plurality of targets, and wherein acquiring the target region, comprises:
determining whether a current predetermined subset of points in the cursor hot spot coincides with any of the target coordinates; and
if not, adjusting the current predetermined subset to a subsequent predetermined subset; and
determining whether the subsequent predetermined subset of points in the cursor hot spot coincides with any of the target coordinates.

11. The method of claim 10 and further comprising:
repeatedly adjusting the current predetermined subset of points in the cursor hot spot and determining whether the subsequent predetermined subset coincides with any of the target coordinates until a subsequent predetermined subset coincides with a set of target coordinates or until all predetermined subsets are exhausted.

12. The method of claim 10 wherein the current predetermined subset comprises a subset located generally proximate a center of the cursor hot spot.

13. The method of claim 12 wherein the current predetermined subset comprises a single point located generally centrally in the cursor hot spot.

14. The method of claim 12 wherein the subsequent predetermined subset is located one of:
a same distance as the current subset from the center of the cursor hot spot; and
a distance further than the current subset from the center of the cursor hot spot.

15. A program for controlling a cursor displayed on a display screen to acquire a target displayed on the display screen, the program comprising instructions arranged to configure a computer to take the steps of:
accessing a coordinate system associated with the display screen, the target corresponding to at least one target point in the coordinate system, and the cursor corresponding to a plurality of cursor points in the coordinate system;
receiving position information from a user input device and moving a cursor position within the coordinate system associated with the display screen based on the position information;
maintaining cursor position information indicative of the cursor position within the coordinate system; and
acquiring the target when the target point coincides with at least one of a predetermined plurality of the cursor points defining a cursor hot spot.

16. The program of claim 15 wherein the program further comprises instructions to configure the computer to take the step of:
providing visual indicia on the display screen indicative of at least some of the predetermined plurality of cursor points.

17. The program of claim 16 wherein the program further comprises instructions to configure the computer to take the step of:
providing visual indicia on the display screen indicative of all of the predetermined plurality of cursor points.

18. The program of claim 15 wherein the program further comprises instructions to configure the computer to take the step of:
changing a number of the predetermined plurality of cursor points defining the cursor hot spot.

19. The program of claim 18 wherein the program further comprises instructions to configure the computer to take the step of:
changing the number of the predetermined plurality of cursor points defining the cursor hot spot based on predetermined locations in the coordinate system and the cursor position.

20. The program of claim 15 wherein the program further comprises instructions to configure the computer to take the step of:
changing the number of the predetermined plurality of cursor points in the cursor hot spot based on a size of targets in locations in the coordinate system proximate the cursor location.

21. The program of claim 18 wherein the program further comprises instructions to configure the computer to take the step of:
changing a cursor display displayed on the display screen based on a change in the number of the predetermined plurality of cursor points in the cursor hot spot.

22. The program of claim 15 wherein the program further comprises instructions to configure the computer to take the step of:
changing a visual indicia indicative of the target when the target point coincides with the at least one of the predetermined plurality of cursor points.

23. The program of claim 15 wherein the coordinate system includes a plurality of sets of target points, each set corresponding to one of a plurality of targets, and wherein acquiring the target, comprises:
determining which of the sets of target points is located closest to the cursor hot spot; and
acquiring a target having coordinates closest to the cursor hot spot.

24. The program of claim 23 wherein determining which of the sets of target points is located closest comprises:
determining which of the sets of target points is located closest to a generally central point of the cursor hot spot.

25. The program of claim 15 wherein the coordinate system includes a plurality of sets of target points, each set corresponding to one of a plurality of targets, and wherein acquiring the target, comprises:

determining whether a current predetermined subset of the predetermined plurality of cursor points defining the cursor hot spot coincides with any of the target points; and if not, adjusting the current predetermined subset to a subsequent predetermined subset; and determining whether the subsequent predetermined subset of the predetermined plurality of cursor points coincides with any of the target points.

26. The program of claim 25 wherein the program further comprises instructions to configure the computer to take the steps of:

repeatedly adjusting the current predetermined subset of the predetermined plurality of cursor points and determining whether the subsequent predetermined subset coincides with any of the target points until a subsequent predetermined subset coincides with a target point or until all predetermined subsets are exhausted.

27. The program of claim 25 wherein the current predetermined subset comprises a subset located generally proximate a center of the cursor hot spot.

28. The program of claim 27 wherein the current predetermined subset comprises a single cursor point located generally centrally in the cursor hot spot.

29. The program of claim 27 wherein the subsequent predetermined subset is located one of a same distance as the current subset from the center of the cursor hot spot, and a distance further than the current subset from the center of the cursor hot spot.

* * * * *

UNITED STATES PATENT AND TRADEMARK OFFICE
CERTIFICATE OF CORRECTION

PATENT NO.     : 6,285,374 B1
DATED          : September 4, 2001
INVENTOR(S)    : Falcon It is certified that error appears in the above-identified patent and that said Letters Patent is hereby corrected as shown below:

Column 1,
Line 47, replace "wise" with -- wide --.

Column 3,
Line 8, replace "bock" with -- block --.

Column 5,
Line 44, replace "a" with -- A --.

Column 7,
Line 32, replace "132" with -- 130 --.

Column 8,
Line 54, replace "to" with -- or --.

Column 9,
Line 67, insert -- a -- before "target".

Column 10,
Line 67, after "cursor" insert -- image --.

Column 11,
Line 5, after "cursor" insert -- image -- both occurrences.

Column 13,
Line 23, replace "targets" with -- target --.

Signed and Sealed this

Eighteenth Day of February, 2003

JAMES E. ROGAN
*Director of the United States Patent and Trademark Office*